(12) United States Patent
Cozzetti

(10) Patent No.: US 11,863,344 B2
(45) Date of Patent: Jan. 2, 2024

(54) ENABLING GLOBAL QUALITY OF SERVICE FOR REAL-TIME SELECTION OF BEST DATA COMMUNICATIONS CHANNELS IN AUTONOMOUS DRIVING VEHICLES

(71) Applicant: Fortinet, Inc., Sunnyvale, CA (US)

(72) Inventor: Hector Agustin Cozzetti, Mougins (FR)

(73) Assignee: Fortinet, Inc., Sunnyvale, CA (US)

( * ) Notice: Subject to any disclaimer, the term of this patent is extended or adjusted under 35 U.S.C. 154(b) by 381 days.

(21) Appl. No.: 17/139,912

(22) Filed: Dec. 31, 2020

(65) Prior Publication Data

US 2022/0209981 A1    Jun. 30, 2022

(51) Int. Cl.
*H04L 12/40* (2006.01)
*B60W 60/00* (2020.01)
*H04W 84/18* (2009.01)
*H04W 4/44* (2018.01)
*H04W 4/46* (2018.01)

(52) U.S. Cl.
CPC ......... *H04L 12/40* (2013.01); *B60W 60/0027* (2020.02); *H04W 4/44* (2018.02); *H04W 4/46* (2018.02); *H04W 84/18* (2013.01); *H04L 2012/40215* (2013.01); *H04L 2012/40273* (2013.01)

(58) Field of Classification Search
CPC .......... H04L 12/40; H04L 2012/40215; H04L 2012/40273; H04W 4/46; H04W 4/44; H04W 84/18; B60W 60/0027
See application file for complete search history.

(56) References Cited

U.S. PATENT DOCUMENTS

| | | | |
|---|---|---|---|
| 10,951,436 B2 * | 3/2021 | Maeda | H04L 12/40 |
| 2018/0054380 A1 * | 2/2018 | Jin | H04L 67/62 |
| 2019/0349254 A1 * | 11/2019 | Nolan | H04L 41/12 |
| 2019/0349426 A1 * | 11/2019 | Smith | H04L 61/4505 |
| 2020/0051015 A1 * | 2/2020 | Davis | G06Q 10/0833 |

* cited by examiner

*Primary Examiner* — Steven G Snyder
*Assistant Examiner* — John B Roche
(74) *Attorney, Agent, or Firm* — LAW OFFICE OF DORIAN CARTWRIGHT; Dorian Cartwright

(57) ABSTRACT

An orchestrator ensures the best available vehicle communication technology is selected. In the computer architecture, the orchestrator is injected on the data bus line is also coupled to a plurality of independent silos of vehicle communication technologies for autonomous driving vehicle technologies. Real-time accurate strength signals associated with the plurality of independent silos are received. One of the independent silos of communication is selected for rerouting the data transfer, based on a type of data involved in the data transfer, and based on a best available of the plurality of independent silos for the data transfer type. The data transfer is directed over the selected independent silo that is the best available.

10 Claims, 6 Drawing Sheets

ENABLING GLOBAL QUALITY OF SERVICE FOR REAL-TIME SELECTION OF BEST DATA COMMUNICATIONS CHANNELS IN AUTONOMOUS DRIVING VEHICLES

FIELD OF THE INVENTION

The invention relates generally to computer networking, and more specifically, to enabling real-time quality of service for data communications between autonomous driving vehicle technologies.

BACKGROUND

Driverless vehicle technologies will soon change the nature of transportation. By relying upon artificial intelligence rather than human intelligence and reaction times, driving fatalities should decrease as safety and efficiency increases in the transportation arena.

One important aspect of enabling AI systems is communication between local vehicles and with a central intelligence. In this vein, there are several technologies proposed for establishing communication between vehicles (V2V) and vehicles to infrastructures (V2I), such as 4G/5G, wireless communication, free-space optical communication, and the like. A new communication network is created using these technologies where nodes are (autonomous) vehicles. A vehicular ad hoc network (VANET) can be formed temporarily.

Each communication technology has been designed to be efficient against specific propagation problems/constrains in their domain (e.g., shadow phenomena for wireless mobile communications, obstruction, and real-time constrain). However, each communication method does not interact with other blocks, it is like a silos approach. Consequently, quality of service today is implemented just per technology (e.g., tags in packets), but not as a global concept for the vehicle.

The current silos approach is not enough if you want to offer quality of service and reliability in this type of critical networks where conditions can change very fast (influencing the transmission capability) and communication requirements are strict.

Therefore, what is needed is a robust technique for enabling global quality of service for real-time selection of best available data communications channel in autonomous driving vehicle communications.

SUMMARY

These shortcomings are addressed by the present disclosure of methods, computer program products, and systems for enabling global quality of service for real-time selection of best available data communications channel in autonomous driving vehicle communications.

In one embodiment, an orchestrator injected on the data bus line is also coupled to a plurality of independent silos of vehicle communication technologies for autonomous driving vehicle technologies. The plurality of independent silos broadcast intended data transfers. Real-time accurate strength signals associated with the plurality of independent silos are received.

In an embodiment, a data transfer over one of the plurality of independent silos is intercepted. A data type involved in the data transfer is determined before allowing the data transfer to continue on any silo of independent technology.

In still another embodiment, one of the plurality of independent silos of communication is selected for rerouting the data transfer, based on a type of data involved in the data transfer, and based on a best available of the plurality of independent silos for the data transfer type. The data transfer is directed over the selected independent silo.

Advantageously, computer performance and network performance is improved with more efficient data transfers and conserving computer resources.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for enabling global quality of service for real-time selection of best available data communications channel in autonomous driving vehicle communications. One of ordinary skill in the art will recognize many additional variations made possible by the succinct description of techniques below. For example, although CAN bus technology is referred to herein for illustration, different bus technologies can also be substituted given the teachings of the disclosure herein.

I. Systems for Best Vehicle Communication QOS Among Independent Silos (FIG. 1-2)

Figure 1:
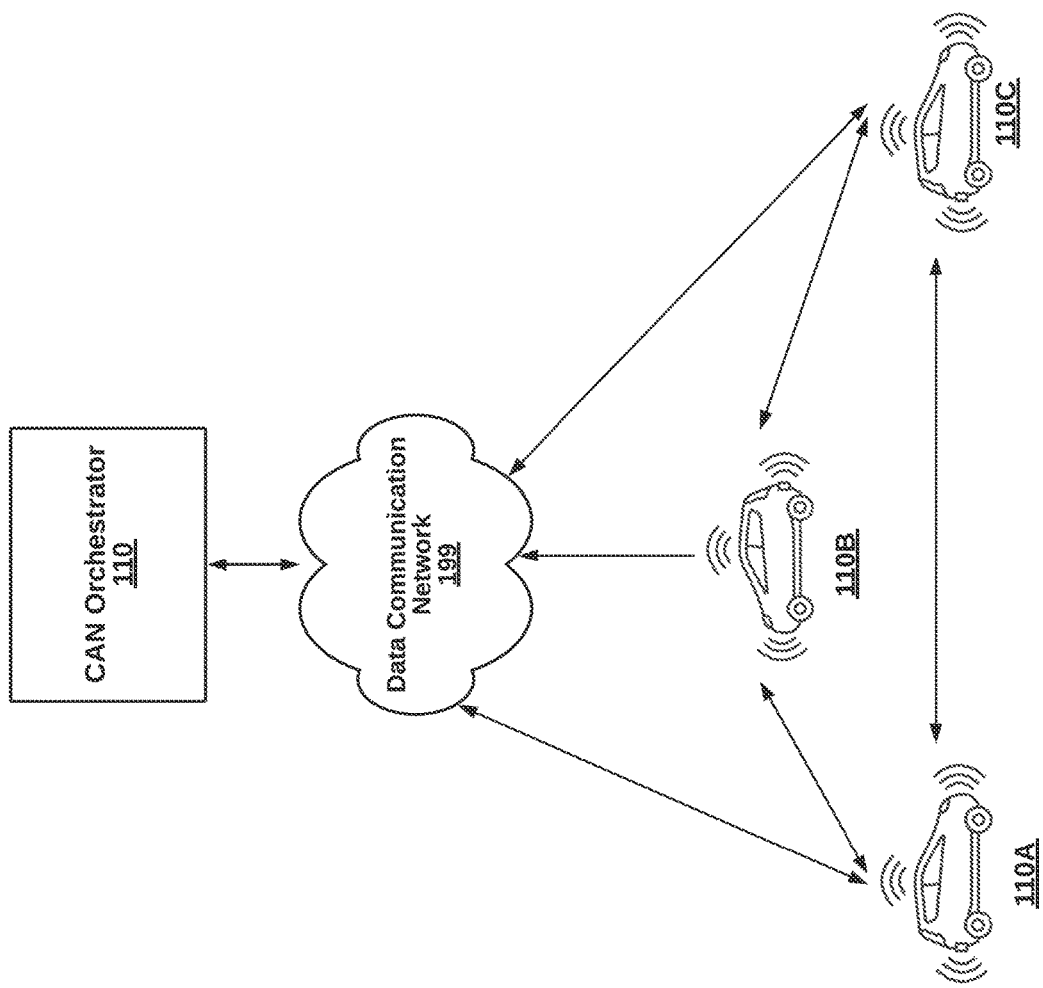
FIG. 1 is a high-level block diagrams illustrating a system for enabling global quality of service for real-time selection of best available data communications channel in autonomous driving vehicle communications, according to one embodiment.
Figure 2:
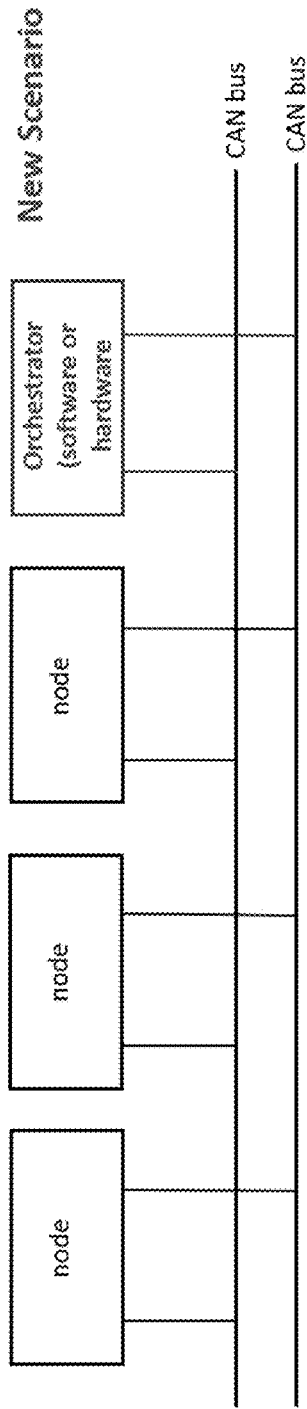
FIGS. 2-5 are block diagrams showing methods of how quality of service is injected to independent vehicle communication silos for real-time best availability.
Figure 2:
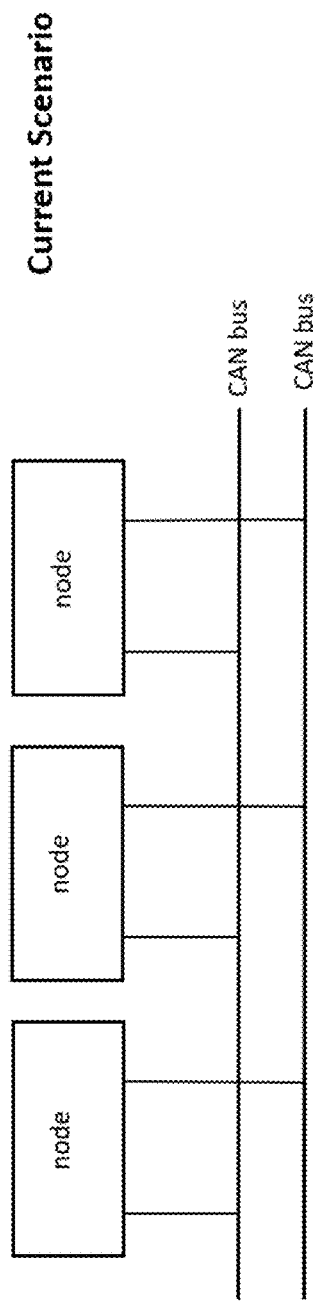

FIG. 1 is a high-level block diagram illustrating a vehicle QOS system 100 for enabling global quality of service for real-time selection of data communications channel in autonomous driving vehicles, according to one embodiment. The vehicle communication system 100 includes a CAN orchestrator 110, autonomous devices 110A,B,C which are capable of communication over any of silo channel 1, silo channel 2 or silo channel 3. Besides a peer-to peer communication, there can also be centralized communications over a wide area network 199 through vehicle communication server 110. There can be many other network components integrated within the autonomous devices 110A,B,C or as independent components, such as a firewall server, an access point, and stations, coupled through a wide area network. Many other embodiments are possible, for example, with more access points, more or fewer stations, additional components, such as firewalls, routers, switches, and the like. Hardware and software components can be implemented similar to the example of FIG. 6.

The wide area network 199 links components of the system 100 with a channel for data communication, for example, over the Internet through CAN orchestrator 110. The CAN orchestrator 110 receives, as an intermediary, communications from one vehicle to another.

The wide area network 199 links components of the system 100 with a channel for data communication, for example, over the Internet through centralized CAN server 120. The centralized CAN server 120 receives, as an intermediary, communications from one vehicle to another.

The CAN orchestrator 110 intercepts data transfers intended for a first vehicle technology and reroutes to a second vehicle technology, based on available vehicle technologies, in an embodiment. Otherwise, the CAN data bus line passively allows devices to make data transfers as determined and intended by the device. The CAN standard is designed to allow microcontrollers and devices to communicate with each other's applications without a host computer. In some cases, device type is used as a priority. However, the CAN orchestrator 110 can override to interject quality of service by directing data transfers to the best available vehicle communication technology.

The CAN orchestrator 110 can be a software module plugged into the vehicle operating system. In another embodiment, an application is downloaded to execute on a processor utilizing the operating system. Still another embodiment includes a hardware control system that is coupled in data communication and electrical communication with other vehicle components, on a master system of the autonomous vehicle. The CAN orchestrator 110 of an embodiment is subject to a higher-level system, i.e., autonomous vehicle master control system, that overrides best silo algorithms.

The autonomous vehicles 110A,B,C communicate data with each other using peer-to-peer vehicle communication technologies, as individual nodes. Various wireless technologies are available over various bandwidths and ranges. Generally, autonomous vehicles are self-driving cars controlled by robots without a human driver. To do so, sensor inputs with the environment are critical, and passing autonomous vehicles can provide data for visibility beyond the individual vehicle. The sensor inputs are communicated by different devices such as radar, lidar, sonar, GPS, odometry and inertial measurement units. A centralized processing system considers all of the inputs for advanced control systems that respond by interpretations of sensory information to identify appropriate navigation paths, as well as obstacles and relevant signage. In other embodiments, partially autonomous vehicles or human-driven vehicles also participate in communications.

In one example, as the autonomous vehicles 110A,B,C sit at a stop light, data can be exchanged between vehicles. One part of data can be road conditions, hazards, traffic data, average speed, safety info, nearby pedestrian info, and the like. Another part of data can be more personal, such as starting point, destination point, cargo data, or passenger data for various applications. In another example, the autonomous vehicles 110A,B can be passing each other at full speed and only have a momentary data exchange. In some cases, peer-to-peer communication can be continued over a centralized communication channel if needed. In another example, rather than sitting at a stop light, the autonomous vehicles pass each other in traffic briefly. Some embodiments exchange on critical information for short connections. In yet other embodiment are implemented on a traditional vehicle that is modified either partially or fully for the autonomous environment.

There can be many devices connected to the CAN bus. Communication technologies built into the vehicle can be tied into the CAN internally. Others can be plugged in or wirelessly connected.

As a result of quality of service guarantees over the CAN data bus architecture shown in FIG. 1, applications are able to run reliably such as traffic prediction applications. More robust data exchanges, especially over a brief connection, lead to more robust analytics. In one embodiment, network security features are enforced by the orchestrator.

Figure 6:
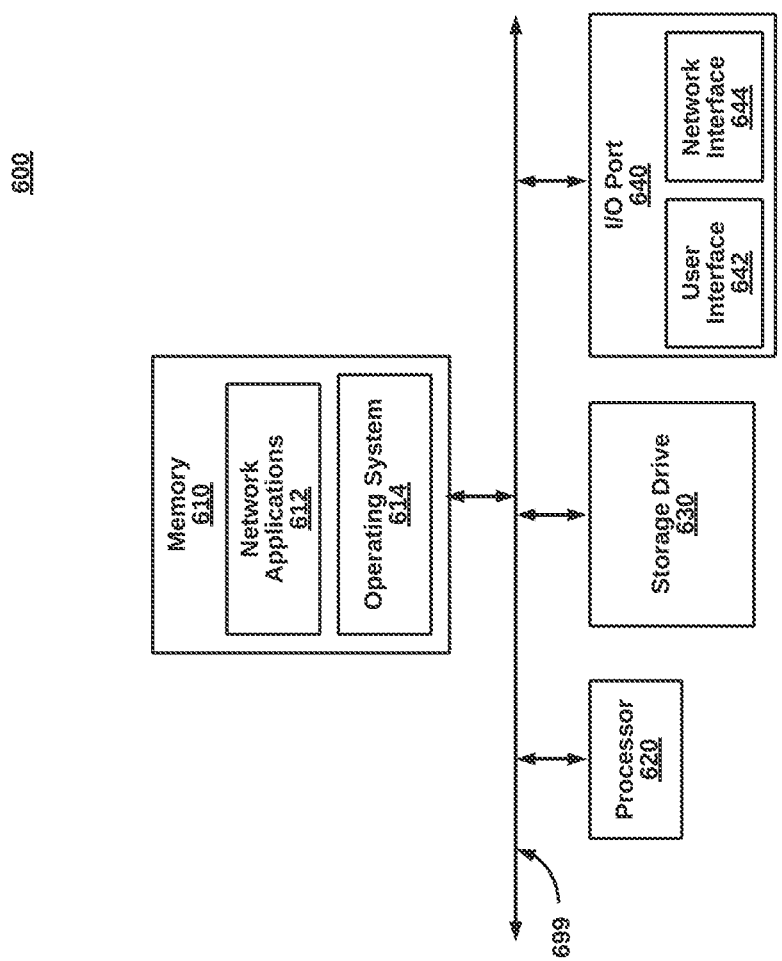
FIG. 6 is a block diagram illustrating an example computing device, according to one embodiment.

The network components of the system 100 can implemented in any of the computing devices discussed herein, for example, a personal computer, a laptop computer, a tablet, a smart phone, a smart watch, a mobile computing device, a server, a cloud-based device, a virtual device, an Internet appliance, an IoT (Internet of things) device, or any of the computing devices described herein, using hardware and/or software (see e.g., FIG. 6).

II. Methods for Best Vehicle Communication QOS Among Independent Silos (FIGS. 2-5)

FIGS. 2-5 are block diagram showing how quality of service is injected to independent vehicle communication silos for real-time best availability.

Figure 3:
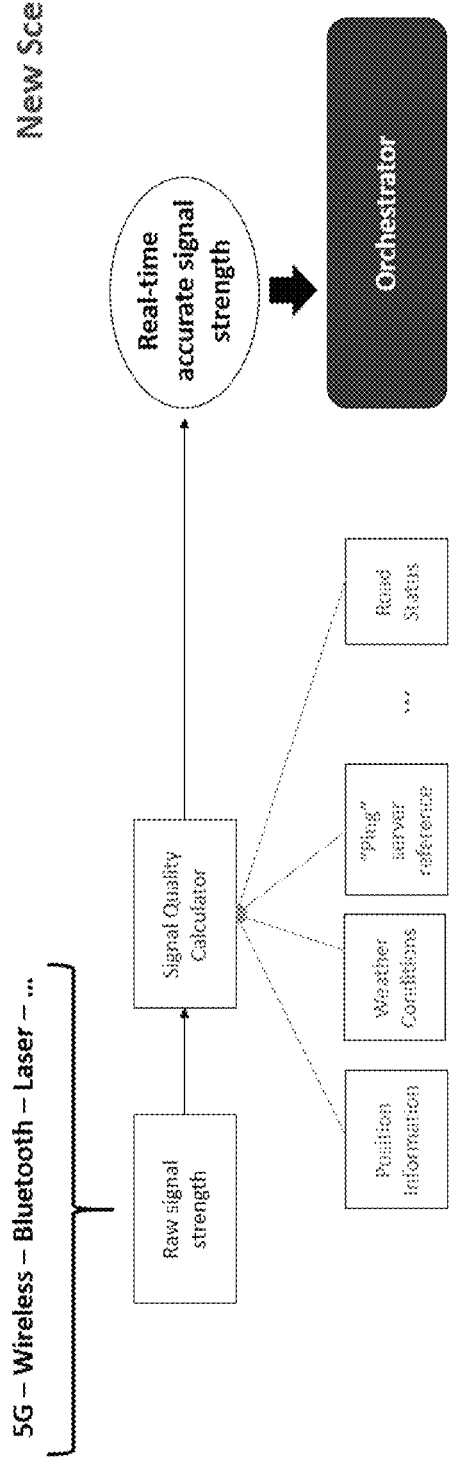

Starting with FIG. 2, an orchestrator is injected to a CAN line 200A relative to 200B. Each of the nodes represent independent silos of vehicle communication technologies for autonomous driving vehicle technologies. The plurality of independent silos broadcast intended data transfers. Next, FIG. 3 shows the introduction of real-time accurate strength signals associated with the plurality of independent silos being received 300A relative to 300B.

In an embodiment, a data transfer over one of the plurality of independent silos is intercepted, with the orchestrator as master over the CAN line. Or the orchestrator is located downstream from the nodes to allow interceptions. A data type involved in the data transfer is determined before allowing the data transfer to continue on any silo of independent technology.

Figure 4:
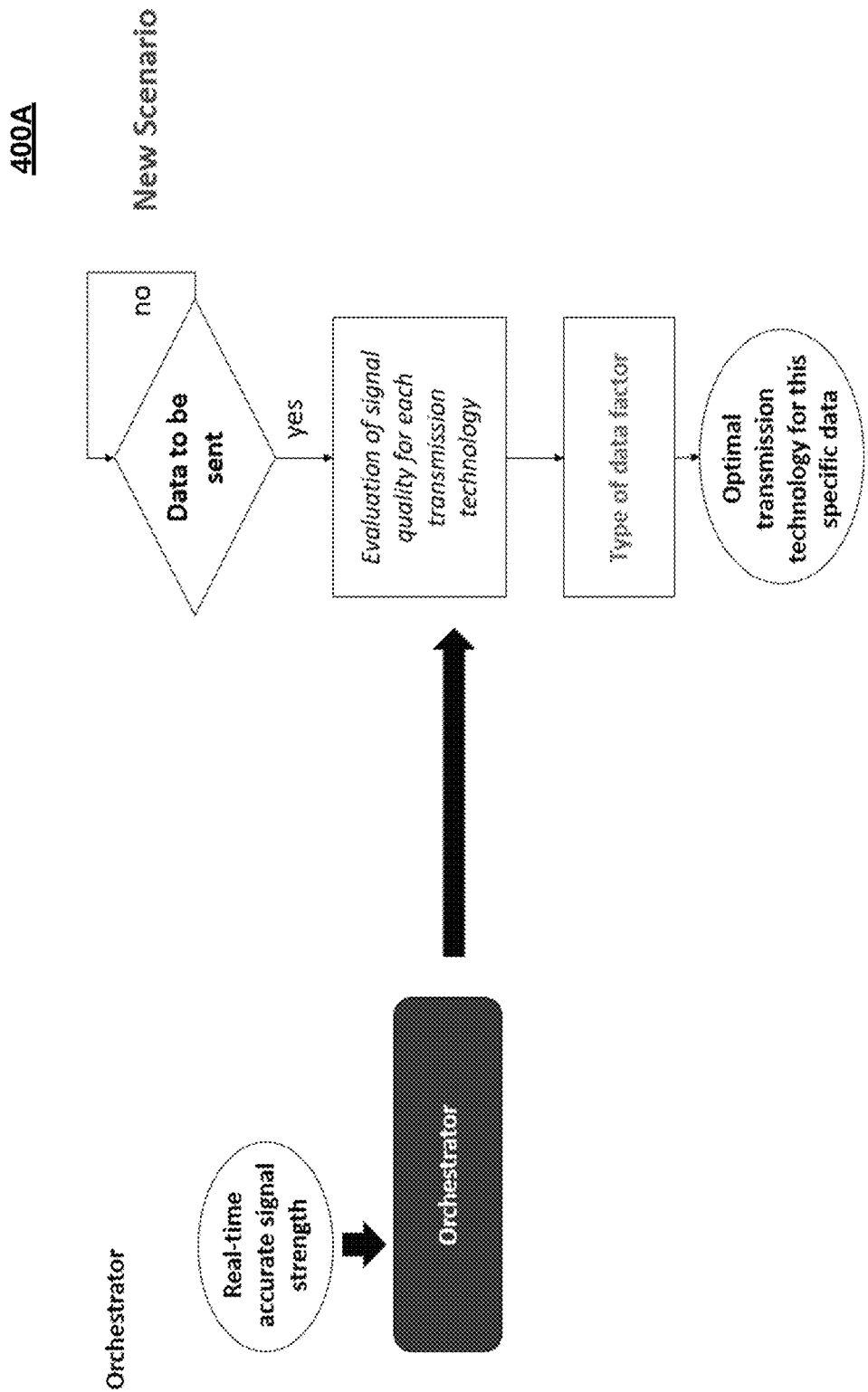
Figure 5:
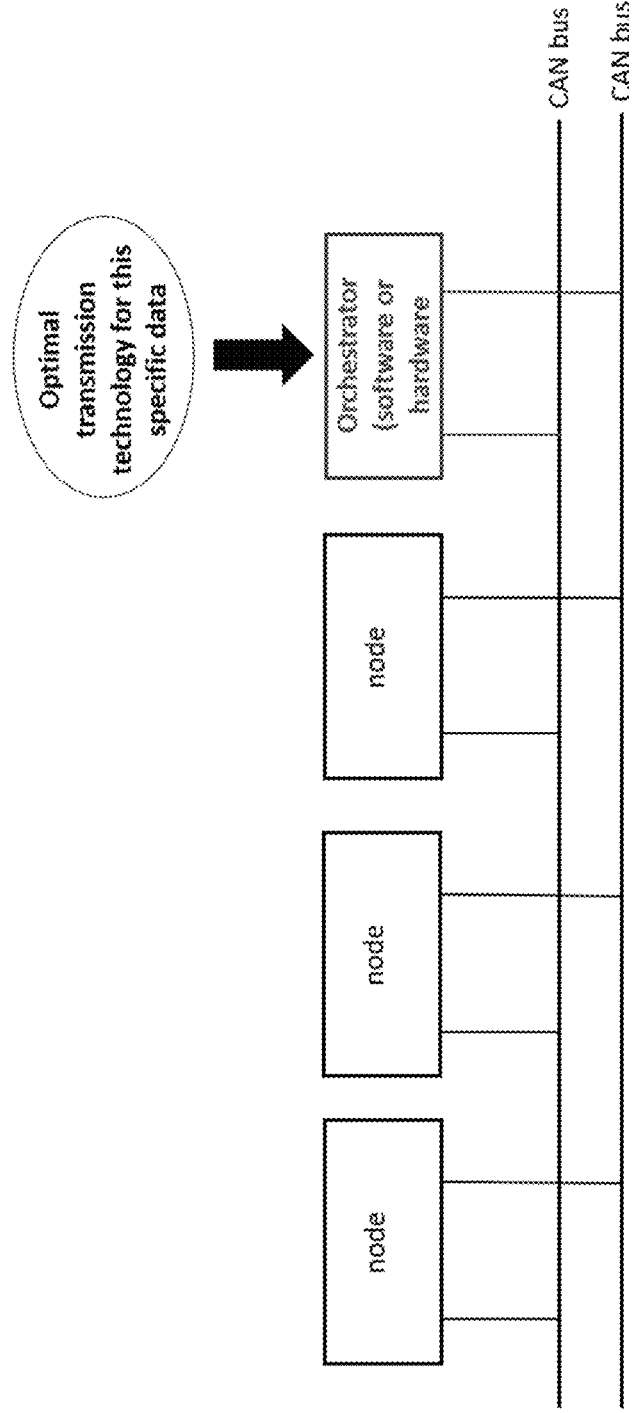

In still another embodiment, FIG. 4 shows flow chart 400A with one of the plurality of independent silos of communication is selected for rerouting the data transfer, based on a type of data involved in the data transfer, and based on a best available of the plurality of independent silos for the data transfer type. The data transfer is directed over the selected independent silo over the best available vehicle communication technology, as summarized in FIG. 5 in 500A.

III. Generic Computing Device (FIG. 6)

FIG. 6 is a block diagram illustrating an example computing device 600 for use in the system 100 of FIG. 1, according to one embodiment. The computing device 600 is implementable for each of the components of the system 100. The computing device 600 can be an autonomous vehicle or a control system on an autonomous vehicle, a vehicle communication device, a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, aIRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer ⅔ routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in a computer system an autonomous vehicle, for enabling quality of service for data communications between autonomous driving vehicles based on best available channels available on a controller area network (CAN) data bus, the method comprising the steps of:

Injecting, by the computer system, an orchestrator on a CAN data bus line that is also coupled to a plurality of independent silos of vehicle communication technologies for autonomous driving vehicle technologies, wherein the plurality of independent silos broadcast intended data transfers;

receiving, by the computer system, real-time accurate strength signals associated with the plurality of independent silos, the strength signals associated with communication technologies;

intercepting, by the computer system, a data transfer over one of the plurality of independent silos, wherein the data transfer involves sending and receiving information from a neighboring autonomous vehicle;

determining, by the computer system, a data type involved in the data transfer;

selecting, by the computer system, one of the plurality of independent silos of communication for rerouting the data transfer, based on a type of data involved in the data transfer, and based on a best available silo of the plurality of independent silos for the data transfer type;

directing, by the computer system, the data transfer over the selected independent silo.

2. The method of claim 1, wherein the step of identifying the behavior sequence comprises:
identifying a priority associated with the data transfer type;
overriding the priority associated with the data transfer type due to the best available of the plurality of silos.

3. The method of claim 1, further comprising:
identifying a priority associated with a device sourcing the data transfer; and
overriding the priority associated with the device based on the data transfer type.

4. The method of claim 1, further comprising:
calculating the real-time accurate signal strength including, receiving a raw signal strength and receiving data for a plurality of factors for consideration in the calculation.

5. The method of claim 1, wherein the silo technology comprises at least one of 4G, 5G, wireless, Bluetooth, laser, LIDAR (light detection and ranging), sensors, WiFi, and infrared.

6. The method of claim 1, wherein data transfer type comprises at least one of the following: warning info, entertainment, infotainment, and road event.

7. The method of claim 1, wherein each data transfer type is characterized by at least one of: delay, transmission horizon, and priority.

8. A non-transitory computer-readable media storing source code that, when executed by a processor, performs a computer-implemented method, in an autonomous vehicle, for enabling quality of service for data communications between autonomous driving vehicles based on best available channels available on a controller area network (CAN) data bus, the method comprising the steps of:

injecting an orchestrator on the CAN data bus line that is also coupled to a plurality of independent silos of vehicle communication technologies for autonomous driving vehicle technologies, wherein the plurality of independent silos broadcast intended data transfers;

receiving real-time accurate strength signals associated with the plurality of independent silos;

intercepting a data transfer over one of the plurality of independent silos;

determining a data type involved in the data transfer;

selecting one of the plurality of independent silos of communication for rerouting the data transfer, based on a type of data involved in the data transfer, and based on a best available silo of the plurality of independent silos for the data transfer type;

directing the data transfer over the selected independent silo.

9. A network security device on a vehicle for enabling quality of service for data communications between autonomous driving vehicles based on best available channels available on a controller area network (CAN) data bus, the network security device comprising:
a processor;
a network communication interface, coupled to the data communication network; and
a memory, comprising:
a module to inject an orchestrator on the CAN data bus line that is also coupled to a plurality of independent silos of vehicle communication technologies for autonomous driving vehicle technologies, wherein the plurality of independent silos broadcast intended data transfers;
the module to receive real-time accurate strength signals associated with the plurality of independent silos;
the module to intercept a data transfer over one of the plurality of independent silos;
the module to determine a data type involved in the data transfer;
the module to select one of the plurality of independent silos of communication for rerouting the data transfer, based on a type of data involved in the data transfer, and based on a best available silo of the plurality of independent silos for the data transfer type; and
the module to direct the data transfer over the selected independent silo.

10. The network security device of claim 9 wherein the network security device is integrated within an autonomous vehicle.

* * * * *